3,402,200
N-POLYAMINOPOLYALKYLENE-
PHENYLENEDIAMINES
Charles M. Hayes, Hoffman Estates, Ill., assignor to Universal Oil Products Company, Des Plaines, Ill., a corporation of Delaware
No Drawing. Filed May 19, 1966, Ser. No. 551,209
5 Claims. (Cl. 260—570.5)

ABSTRACT OF THE DISCLOSURE

Reductive alkylation product of a ketone with the reaction product of nitrohalobenzene or haloaniline and an alkylene polyamine. The compounds are useful as stabilizers for hydrocarbon oils, lube oils, plastics and other organic substrates normally subject to oxidative deterioration.

---

This invention relates to a novel composition of matter and use thereof as an additive in organic substrates.

The novel composition of matter of the present invention may be illustrated by the following formula:

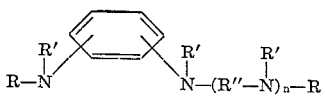

where R is sec-alkyl of from 3 to about 20 carbon atoms, R' is hydrogen or sec-alkyl of from 3 to about 20 carbon atoms, R" is alkylene of from 2 to about 10 carbon atoms, and $n$ is an integer of from 1 to 5.

The compounds of the present invention are prepared in any suitable manner. In a particularly preferred method, these compounds are prepared by a series of steps which includes (1) reaction of nitrohalobenzene or haloaniline with an alkylene polyamine, and (2) reductive alkylation of the product formed in the above manner with a ketone.

The reaction of the nitrohalobenzene and alkylene polyamine is effected in any suitable manner. In general, this reaction is effected by mixing and heating the reactants to a temperature of from about 100° to about 140° C. in the presence or absence of a catalyst. The reaction is exothermic and, therefore, it is not necessary to heat the mixture of reactants to above about 120° C. but, on the other hand, it may be necessary to cool the reaction mixture in order to keep the temperature below about 140° C. When a catalyst is employed, any suitable catalyst may be used as, for example, cuprous chloride. The mole proportions of reactants are selected to react equal mole proportions of the alkylene polyamine and the nitrohalobenzene or haloaniline. While equal mole proportions of the reactants may be used, it generally is preferred to utilize an excess of the alkylene polyamine to assure complete reaction and this excess may range up to 10 or more mole proportions of alkylene polyamine per 1 mole proportion of the halo compound. The product will generally be recovered as a solid. When desired, the product may be purified by washing with a suitable solvent or recrystallizing from a suitable solvent.

The nitrohalobenzene and alkylene polyamine will be selected to form the desired final product. Any suitable nitrohalobenzene may be employed and includes the ortho-, meta- and para-isomers. In one embodiment, the para-isomer is preferred and thus a preferred reactant is p-nitrochlorobenzene. In aonther embodiment, the ortho-isomer is preferred and the preferred reactant in this embodiment is o-nitrochlorobenzene. While the chloro derivatives are preferred, it is understood that the bromo iodo and fluoro derivatives may be used. In another embodiment, the corresponding aminohalobenzenes (haloanilines) may be used in place of the nitro derivatives. In still another embodiment, the phenyl ring may contain 1 or more hydrocarbon substituents attached thereto.

Any suitable alkylene polyamine is used for reacting with the nitrohalobenzene. In general, the alkylene moiety of the alkylene polyamine will contain from 2 to about 10 carbon atoms and the alkylene polyamine will contain from 2 to 6 nitrogen atoms. Illustrative alkylene polyamines include ethylenediamine, diethylenetriamine, triethylenetetramine, tetraethylenepentamine, pentaethylene hexamine, etc.; propylenediamine, dipropylenetriamine, tripropylenetetramine, tetrapropylenepentamine, pentapropylenehexamine, etc.; and corresponding alkylene polyamines in which the alkylene group is selected from butylene, pentylene, hexylene, heptylene, octylene, nonylene and decylene.

The product formed by the reaction of the nitrohalobenzene or haloaniline and alkylene polyamine is subjected to reductive alkylation with a ketone containing from 3 to about 20 carbon atoms. Illustrative but not limiting ketones include methyl ethyl ketone, methyl propyl ketone, methyl butyl ketone, methyl pentyl ketone, methyl hexyl ketone, methyl heptyl ketone, methyl octyl ketone, methyl nonyl ketone, methyl decyl ketone, methyl undecyl ketone, methyl dodecyl ketone, methyl tridecyl ketone, methyl tetradecyl ketone, methyl pentadecyl ketone, methyl hexadecyl ketone, methyl heptadecyl ketone, methyl octadecyl ketone; diethyl ketone, ethyl propyl ketone, ethyl butyl ketone, ethyl pentyl ketone, ethyl hexyl ketone, ethyl heptyl ketone, ethyl octyl ketone, ethyl nonyl ketone, ethyl decyl ketone, ethyl undecyl ketone, ethyl dodecyl ketone, ethyl tridecyl ketone, ethyl tetradecyl ketone, ethyl pentadecyl ketone, ethyl hexadecyl ketone, ethyl heptadecyl ketone; dipropyl ketone, propyl butyl ketone, propyl pentyl ketone, propyl hexyl ketone, etc. and other ketones containing up to about 20 carbon atoms per molecule.

The reductive alkylation is effected in any suitable manner and in either a single or multiple step operation. In a particularly preferred method, the reductive alkylation is effected in a single step, employing a hydrogen pressure of from about 100 to 3,000 p.s.i.g. or more. Any suitable catalyst is employed including those containing nickel, cobalt, platinum, palladium, molybdenum, etc. or a mixture of these or of the oxides of chromium, copper and barium, preferably composited with a suitable support. A particularly preferred catalyst comprises a composite of platinum and alumina, containing from about 0.1 to about 5% by weight of platinum, which may or may not contain chlorine and/or fluorine in a total halogen content of about 0.1% to about 5% by weight. When using the platinum catalyst, the temperature generally will be in the range of from about 100° to about 250° C. In a preferred continuous operation, the catalyst is deposited as a fixed bed in a reaction zone and the reactants and hydrogen, at the desired temperature and pressure, are passed therethrough, in either upward or downward flow. The mole ratio of ketone to amine compound will be selected to effect reductive alkylation at the terminal nitrogen atoms and thus will be at least 2 mole proportions of ketone per one mole proportion of amine compound. Generally, an excess of ketone is employed to insure complete reaction and this excess may range up to about 20 mole proportions of ketone per amine compound.

In an ideal reaction, only the terminal nitrogen atoms of the amine compound are reductively alkylated. However, it is believed that a mixture of reductively alkylated products are formed, particularly when an excess of ketone is utilized in the reductive alkylation. Referring to the general formula hereinbefore set forth, it will be noted that additional reductive alkylation may occur, as indicated by R', at an intermediate nitrogen and/or to replace the second hydrogen atom of the terminal nitrogens. Accordingly, it is understood that the novel compounds of the present invention include a mixture of such reductively alkylated compounds.

When desired, the preparation of the compounds of the present invention may be effected using a suitable solvent in any stage of the preparation. Any suitable solvent may be employed and may comprise a hydrocarbon, including aromatic hydrocarbons such as benzene, xylene, toluene, ethyl benzene, cumene, etc. or paraffinic hydrocarbons including pentane, hexane, heptane, octane, etc. or mixtures of hydrocarbons. When employed, the solvent may be allowed to remain in the product or the solvent may be removed in any suitable manner, including vacuum distillation, centrifuging in the case where the intermediate product which is solid, etc. The final product may be prepared as a solution in a suitable solvent and, when desired, the solvent employed in the preparation may be used as part or all of the solvent in the final product.

The compounds of the present invention will have varied utility. In one embodiment, the compound is used as an antioxidant in organic substrates subject to oxidative deterioration, such organic substrates including hydrocarbon oils such as gasoline, naphtha, kerosene, diesel fuel, fuel oil, etc.

In another embodiment, the novel compounds of the present invention may be used as an additive in lubricating oil which may be of mineral origin or synthetically prepared. The synthetic lubricating oils are of various types including (1) aliphatic esters, particularly dialkyl sebacates, dialkyl azealates, dialkyl suberates, dialkyl pimelates, dialkyl adipates, dialkyl glutarates, etc. (2) polyalkylene oxides including polyisopropylene oxide, polyisopropylene oxide diether, polyisoproylene oxide diester, etc. (3) silicones including methyl silicone, ethylphenyl silicone, etc. (4) silicates including tetraisooctyl silicate, etc., fluorinated hydrocarbon including fluorinated oil, perfluoronated hydrocarbons, etc. (5) neopentylglycol esters including neopentylglycol propionate, neopentyl glycol butyrlate, neopentyl glycol caproate, neo pentyl glycol caprolate, neopentyl glycol pelargonate, (6) trialkylol alkane esters including esters of trimethylol propane, trimethylol butane, trimethylol pentane, trimethylol hexane, etc. and particularly the triesters in which each ester portion contains from 3 to 12 carbon atoms, (7) tricresyl phosphate, trioctyl phosphate, trinonyl phosphate, etc., as well as mixed aryl and alkyl phosphates, etc. The lubricating oils of petroleum origin include those referred to as motor lubricating oil, railroad type lubricating oil, marine oil, transformer oil, turbine oil, transmission oil, differential oil, gear oil, cutting oil, rolling oil, slushing oil, etc.

In still another embodiment the compounds of the present invention are used as additives in grease, which are solid or semi-solid gels and, in general, are prepared by the addition to mineral or synthetic oils of hydrocarbon soluble metal soaps or salts of higher fatty acids as, for example, lithium stearate, aluminum naphthanate, etc. The grease may contain thickening agents such as silica, carbon black, polyacrylates, talc, etc. Other types of grease are prepared from oxidized petroleum wax. Still other types of grease include petroleum grease, whale grease, wool grease, etc. and those made from inedible fats, tallow, butcher's waste, etc.

In still another embodiment, the compounds of the present invention may be used in the stabilization of polyolefins including polyethylene, polypropylene, polybutylene, or copolymers of ethylene, propylene and/or butylene. The novel compounds also may be used as additives in other plastic materials including polystyrene, polyvinyl resins derived from monomers such as vinylchloride, vinylacetate, vinylidine chloride, etc. As additives in plastic type materials the compounds of the present invention may serve both as antioxidant and as ultraviolet light absorber.

In still another embodiment, the compounds of the present invention may be used as additives in rubber, which may be of natural or synthetic orgin. The natural rubbers include hevea rubber, caoutchouc, balata, gutta percha, etc. Synthetic rubbers include SBR (copolymers of butadiene and styrene), copolymers of butadiene and acrylonitrile, copolymers of butadiene and isobutylene, etc. In the rubber, the compounds of the present invention may serve both as antioxidant and as antiozonant.

In still another embodiment, the compounds of the present invention and particularly those compounds in which $n$ in the above general formula is from 2 to 5, may be used as curing agents for plastics or resins which undergo curing. These resins include those of the type known in the art as polyurethanes, epoxy resins, etc.

The above are typical organic substrates which may be benefited by incorporating the novel compounds of the present invention. The concentration of the novel compound to be used as additive will depend upon the particular substrate and will range from about 0.001% to about 25% and more particularly from about 0.1% to about 5% by weight of the substrate. It is understood that the compound of the present invention may be used in admixture with other additives incorporated in the substrate for particular purposes including, for example, additional antioxidant, additional antiozonant, metal deactivator, detergent, dye, etc. When desired, the compound of the present invention may be prepared as a mixture with one or more of these other additives and incorporated in this manner into the organic substrate.

The following examples are introduced to illustrate further the novelty and utility of the present invention but not with the intention of unduly limiting the same.

EXAMPLE I

The compound of this example was prepared by the reductive alkylation of N-(2-aminoethyl)-p-phenylenediamine (the reaction product of p-nitrochlorobenzene and ethylenediamine followed by hydrogenation) with methyl ethyl ketone. Two separate preparations of the reaction of p-nitrochlorobenzene with ethylenediamine were made and these batches were combined for use in the subsequent preparation. The first batch was prepared by heating a mixture of 314 g. of p-nitrochlorobenzene and 600 g. of ethylenediamine to 120° C. The reaction was exothermic and the temperature rose to 130° C., at which time the reaction mixture was cooled to maintain the reaction mixture at 120–130° C. for four hours. The product was recrystallized from cyclohexane and recovered as an orange solid. The second preparation was made in substantially the same manner except that the reaction was effected in the presence of about 5 g. of cuprous chloride as catalyst and the temperature was maintained by cooling to about 120–130° C. for 2½ hours. Water was added to the reaction mixture and the product was filtered under suction to remove the catalyst and then was recrystallized from hot cyclohexane. Here, again, the product was recovered as an orange solid.

The two preparations prepared as described above were combined and hydrogenated to form the corresponding N - (2 - aminoethyl) - p - phenylenediamine. The hydrogenation was effected in a rocker bomb at a temperature of about 100° C. under a maximum hydrogen pressure of 125 atmospheres and a platinum-alumina catalyst. The reaction product was recovered as a dark liquid.

The N - (2 - aminoethyl) - p - phenylenediamine, prepared in the above manner, was subjected to reductive alkylation with methyl ethyl ketone. The reductive alkylation was effected in a rocker bomb using 101 g. of the N - (2 - aminoethyl) - p - phenylenediamine, 200 g. of methyl ethyl ketone, 100 g. of a platinum-alumina catalyst containing about 0.3% by weight of platinum, at a temperature of about 160° C. and under a maximum hydrogen pressure of 145 atmospheres for about 7 hours. Upon completion of the reaction, the reaction mixture was filtered to remove the catalyst and then was distilled to remove unreacted ethylenediamine. The product had a boiling point of 155–156° C. at 0.1 mm./hg. Basic nitrogen equivalent weight was found to be 111 at the first break. This demonstrates that the reaction product is a mixture of compounds and is believed to be a mixture of compounds in which both R groups in the above general formula are sec-butyl and 1,2 or 3 of the R′ groups also are sec-butyl.

EXAMPLE II

The compound of this example is prepared by first reacting o-nitrochlorobenzene with diethylenetriamine and then subjecting the mixture to reductive alkylation with ethyl amyl ketone. The reaction of o-nitrochlorobenzene and diethylenetriamine is effected in substantially the same manner as described in Example I, omitting the catalyst. The product then is subjected to reductive alkylation with ethyl amyl ketone in the presence of the alumina-platinum catalyst at a temperature of about 160° C. and a hydrogen pressure of 140 atmospheres, utilizing 4 proportions of ketone per one mole proportion of amine compound. When the reaction is complete, the reaction mixture is filtered to remove the catalyst and then is distilled under vacuum to remove unreacted ketone. The product is recovered as a dark liquid.

EXAMPLE III

The product of this example is prepared by first reacting p-nitrochlorobenzene with tetraethylene pentamine in the manner hereinbefore described and then reductively alkylating with methyl hexyl ketone. The reductive alkylation is effected at a temperature of about 160° C. under a hydrogen pressure of about 140 atmospheres in the presence of platinum-alumina catalyst, utilizing 3 mole proportions of ketone per one mole proportion of amine compound. Here, again, it is noted that the product is a mixture of compounds in which the terminal nitrogen atoms are reductively alkylated and one or more of the intermediate nitrogen atoms also are reductively alkylated.

EXAMPLE IV

The mixed product, prepared as described in Example I, was evaluated as an additive in synthetic lubricating oil. The synthetic lubricating oil is di-octyl sebacate, marketed under the trade name "Plexol-201." The evaluation was made in accordance with a standard Oxygen Stability Test, in which a 100 cc. sample of the synthetic lubricating oil is placed in a bath maintained at 204° C., and air is blown therethrough at a rate of 5 liters of air per hour. The sample of synthetic lubricating oil is examined periodically and the time to reach an acid number of 5 is reported as the induction period. It is apparent that the longer the time required to reach the induction period demonstrates the greater stability of the lubricating oil.

The following table reports the results of evaluations made in the above manner when using a control sample (without additive) of the synthetic lubricating oil and when using a sample of the same lubricating oil containing 2% by weight of the product prepared as described in Example I.

Table I

| Additive: | Induction Period |
|---|---|
| None | 9 |
| 2% of Ex. I | >48 |

From the data in the above table, it will be seen that the mixed product prepared as described in Example I was effective in considerably improving the stability of the lubricating oil upon exposure to air at elevated temperature. In addition to the above, the oil after such exposure to air at the elevated temperature, was analyzed for percent of insolubles and percent change in viscosity. The insolubles were found to be only 0.58% and the change in viscosity was only 5.4% This further demonstrates that the additive was effective in retarding deterioration of the lubricating oil.

EXAMPLE V

The mixed product prepared as described in Example III is utilized as a curing agent in polyurethane. A prepolymer of the polyurethane is prepared by the reaction of toluene - 2,4 - diisocyanate and anhydrous polytetramethyleneether glycol. Such a prepolymer has a free polyisocyanate content of 4.2%, a Brookfield viscosity at 30° C. of about 16,500 cps., and an average molecular weight of about 2,000. About 9 parts by weight of the product, prepared as described in Example III, are used as a curing agent per 100 parts by weight of the prepolymer. These are mixed at room temperature and stirred for one minute while heating slightly. The mixture then is poured into a slab rubber mold and cured for three hours at 100° C.

I claim as my invention:
1. A compound of the following formula

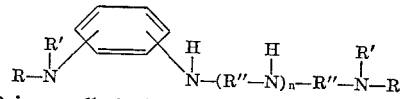

where R is sec-alkyl of from 3 to about 20 carbon atoms, R′ is hydrogen or sec-alkyl of from 3 to about 20 carbon atoms, R″ is alkylene of from 2 to about 10 carbon atoms, and $n$ is an integer of from zero to 4.

2. The compound of claim 1 wherein R″ is ethylene and $n$ is zero.
3. The compound of claim 1 wherein at least one R′ is sec-alkyl of from 3 to about 20 carbon atoms.
4. The compound of claim 1 wherein R is sec-butyl.
5. The compound of claim 1 wherein R is sec-octyl.

References Cited

UNITED STATES PATENTS 1,757,394    5/1930    Schulemann et al. ___ 260—570.5
3,198,763    9/1965    Peterli _____ 260—570.5 XR

FOREIGN PATENTS 919,711    2/1963    Great Britain.
966,083    8/1964    Great Britain.

CHARLES B. PARKER, *Primary Examiner.*
ROBERT V. HINES, *Assistant Examiner.*